(12) United States Patent
Rauh et al.

(10) Patent No.: US 7,197,086 B2
(45) Date of Patent: Mar. 27, 2007

(54) WIDE-BANDWIDTH, HIGH-DYNAMIC-RANGE LINEAR AMPLIFIER FOR A CDMA TRANSMITTER IN A WIRELESS BASE STATION

(75) Inventors: Michael John Rauh, Canal Winchester, OH (US); Robert T. Whitacre, Plain City, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 768 days.

(21) Appl. No.: 10/448,148

(22) Filed: May 29, 2003

(65) Prior Publication Data

US 2004/0240583 A1 Dec. 2, 2004

(51) Int. Cl.
*H04L 25/49* (2006.01)
(52) U.S. Cl. .......................... 375/297; 333/10; 333/150
(58) Field of Classification Search ................. 375/295, 375/296, 297, 300; 330/250, 251, 270 R, 330/207 A, 10, 127, 129, 135, 149, 150, 330/151, 152
See application file for complete search history.

(56) References Cited

U.S. PATENT DOCUMENTS

| | | | | |
|---|---|---|---|---|
| 3,900,823 A * | 8/1975 | Sokal et al. | ................ | 330/149 |
| 4,546,342 A * | 10/1985 | Weaver et al. | ................ | 341/51 |
| 5,767,900 A * | 6/1998 | Tanji et al. | ................ | 348/253 |
| 6,178,186 B1 * | 1/2001 | Baker et al. | ................ | 370/517 |
| 6,236,267 B1 * | 5/2001 | Anzil | ........................ | 330/149 |
| 6,292,054 B1 | 9/2001 | Ma et al. | .................... | 330/126 |
| 6,686,957 B1 * | 2/2004 | Johnson et al. | .......... | 348/222.1 |
| 2002/0057729 A1 * | 5/2002 | Farbod et al. | ............... | 375/150 |

OTHER PUBLICATIONS

Kahn, Leonard R., "Single-Sideband Transmission by Envelope Elimination and Restoration", *Proc. IRE.*, vol. 40, No. 7, (Jul. 1952), pp. 803-806.
Raab, F. H, et al, "High-Efficiency Single-Sideband HF/VHF Transmitter Based Upon Envelope Elimination and Restoration", *HF Radio Systems and Techniques*, (Jul. 4-7, 1994), IEE Conf. Publ. No. 392, pp. 21-25.
Raab, F. H., et al, "High-Efficiency L-Band Kahn-Technique Transmitter", *IEEE MTT-S Digest*, WE2C-5, (1998), pp. 585-588.
Stiebel, Christoph, et al, "New Concept of a Hybrid Amplifier for Driving Piezoelectric Actuators", *1st IFAC-Conference on Mechatronic Systems. Darmstadt, Germany*, (Sep. 18-20, 2000), pp. 379-384.

* cited by examiner

Primary Examiner—Pankaj Kumar
Assistant Examiner—Naheed Ejaz
(74) Attorney, Agent, or Firm—Stephen M. Guery

(57) ABSTRACT

A CDMA base station transmitter employing the Kahn envelope-elimination-and-restoration technique includes a switching amplifier adapted to linearly amplify the low-level baseband signal derived from the digital amplitude information portion of the digital CDMA signal to be transmitted downlink. In order to achieve the wide bandwidth and high dynamic range needed to linearly amplify the low-level baseband signal derived from the digital amplitude portion of the CDMA signal, a truncating circuit truncates a predetermined number of the least significant bits of each word of the digital amplitude portion before the amplitude portion is converted to a low-level baseband signal and is amplified by the switching amplifier. High resolution is restored to the amplified output by a power-dissipating post regulator at the output of the switching amplifier.

14 Claims, 3 Drawing Sheets

WIDE-BANDWIDTH, HIGH-DYNAMIC-RANGE LINEAR AMPLIFIER FOR A CDMA TRANSMITTER IN A WIRELESS BASE STATION

TECHNICAL FIELD

This invention relates to wireless communication, and more particularly to a transmitter in a base station of a wireless communication system, and more particularly to a linear amplifier having a wide bandwidth and a high dynamic range.

BACKGROUND OF THE INVENTION

A base station transmitter in a mobile communications system transmits a high-power-level downlink signal to the mobile terminal within its coverage area. Generally, the base station transmitter converts a digital downlink signal to be transmitted to separate baseband signals containing amplitude and phase information, which are then amplitude and phase modulated onto a low-power-level RF signal. The resultant low-level RF signal is then amplified to a high power level for transmission via an antenna. Since the low-level RF signal is both amplitude- and phase-modulated, the high-power-level RF signal transmitted by the base station needs to be linearly related to the low-level RF signal in order for a mobile terminal to recover the modulating amplitude information. Conventionally a chain of class A linear amplifiers have been used to amplify the low-level RF signal, with a class AB amplifier being used at the output stage to provide the input to the transmitting antenna. It is well known, however, that linear amplifiers are costly and highly power inefficient, requiring large power supplies and associated cooling equipment. In order to minimize base station costs and size, therefore, a high efficiency (i.e., low loss) amplifier is desirable.

In order to improve efficiency, base stations in TDMA mobile communication systems have employed a well-known Kahn envelope-elimination-and-restoration technique for power-amplifying the RF signal for transmission. In accordance with this technique, digital amplitude information and phase information in the input signal are separated. A baseband signal derived from the digital phase information is modulated onto an RF carrier and amplified by non-linear amplifiers, which are quite efficient. An RF power amplifier then amplifies the phase-modulated carrier and modulates the amplitude of that RF signal with a baseband signal derived from the digital amplitude information. Before being supplied to the RF power amplifier, however, that amplitude-modulating signal is amplified by a linear amplifier. Typically, a linear amplifier that is more efficient than a class AB amplifier is used to amplify this signal such as, for example, a class D or a class S switching amplifier.

For a TDMA signal having a bandwidth of approximately 30 kHz, the switching frequency of such a switching amplifier needs to be approximately 300 kHz, which is within the capabilities of conventional prior art switching amplifiers. A switching amplifier that operates at that speed has a dynamic range (i.e., the capability of the amplifier to produce an output having a number of distinct and distinguishable output levels corresponding to the separate and distinct possible input levels, expressible in terms of dB or of bits of resolution) that is high enough for such TDMA signals. In a CDMA mobile communication system, however, the CDMA signal has a bandwidth that is standardized in current systems at 1.25 MHz. For use in a CDMA transmitter, a switching amplifier would need to operate at a switching frequency of at least 5 MHz and have a dynamic range of at least 72 dB for 12 bits of resolution, which is beyond the capabilities of prior art switching amplifiers.

A need exists, therefore, in a CDMA transmitter for a linear amplifier that has a wide bandwidth and high dynamic-range.

SUMMARY OF THE INVENTION

In an embodiment of the present invention, a CDMA base station transmitter employing the Kahn envelope-elimination-and-restoration technique includes a switching amplifier adapted to linearly amplify the low-level baseband signal derived from the digital amplitude information portion of the digital CDMA signal to be transmitted downlink. The resultant high-level baseband signal is then used to amplitude-modulate the output of an RF power amplifier that is adapted to provide a high level of amplification to an RF-modulated baseband signal that has been derived from the digital phase information portion of the CDMA signal. The resultant phase- and amplitude-modulated high-power-level RF signal is provided to an antenna for transmission. In order to achieve the wide bandwidth and high dynamic range needed to linearly amplify the low-level baseband signal derived from the digital amplitude portion of the CDMA signal, a truncating circuit truncates a predetermined number of the least significant bits of each word of the digital amplitude portion before the amplitude portion is converted to a low-level baseband signal and is amplified by the switching amplifier. Since the resultant low-level baseband signal has less granularity or resolution (i.e., a fewer number of possible levels), the dynamic range of the switching amplifier can be significantly lower that would be required to amplify a higher granularity low-level baseband signal derived from the full bit-wise amplitude portion of the CDMA signal. High granularity is restored to the amplitude modulated signal applied to the RF power amplifier by modifying the amplified low-resolution signal in accordance with the high granularity amplitude information contained in the low-level baseband amplitude signal derived from the all the bits in each word of the amplitude portion. In a first embodiment, a power-dissipating post regulator, connected to the output of the switching amplifier dissipates the switching amplifier's high level, low resolution output power in accordance with an error signal produced in a high-gain feedback loop from the difference between the output of the post regulator and the baseband signal derived from the all the bits in each word of the amplitude portion, thereby driving the error signal to zero and imparting the desired high granularity to the post regulator output. The resultant high-level, high-resolution baseband signal is then used to amplitude modulate the output of the RF power amplifier. In a second embodiment, the high-level, low-resolution output of the switching amplifier is used to provide high-level amplitude modulation to the RF power amplifier while the low-level high-resolution baseband signal derived from the all the bits in each word of the amplitude portion is used to provide low-level modulation to the RF power amplifier. For example, if an FET implements the RF power amplifier, the high-level modulation is provided via the drain of the FET while the low-level modulation is provided via the gate of the FET. The combination of the high-level and low-level modulation restores the desired resolution to the amplitude modulating signal applied to the output of the RF power amplifier.

An embodiment of the present invention is also a wide bandwidth, high dynamic range linear amplifier that includes a truncating circuit for truncating a predetermined number of the least significant bits of a high granularity digital input signal before being inputted as a baseband signal to a switching amplifier stage, and a power dissipating post regulator stage, that dissipates power in the switching amplifier's low-resolution output signal in accordance with an error signal produced in a high-gain feedback loop from the difference between the output of the post regulator and a baseband signal derived from the all the bits of the digital input signal, thereby driving the error signal to zero and imparting the desired high resolution to the output of the post regulator.

DETAILED DESCRIPTION

Figure 1:
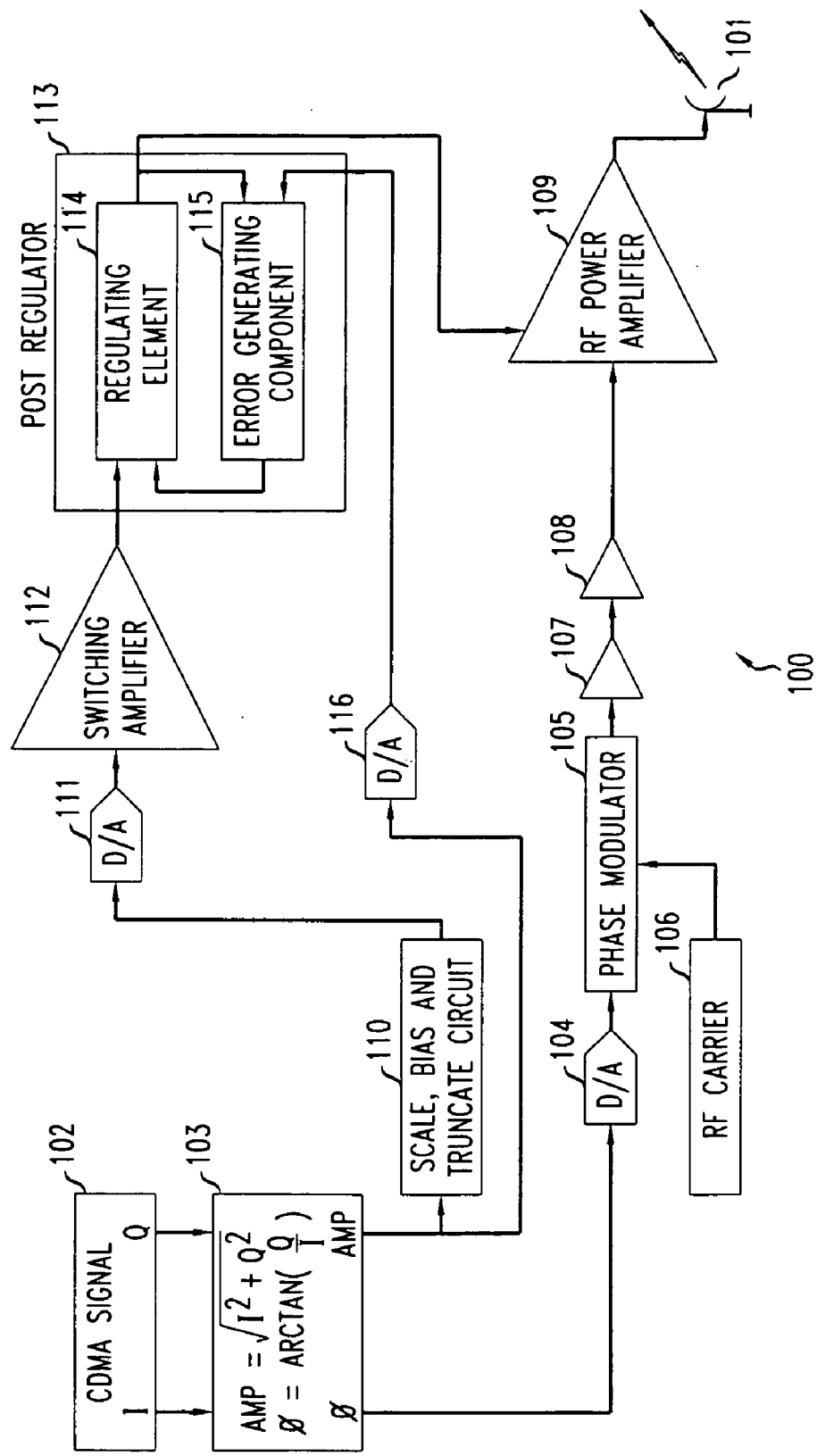
FIG. 1 is a block diagram of a first embodiment of a CDMA transmitter in accordance with the present invention.

With reference to FIG. 1, a CDMA base station transmitter 100 employing the Kahn envelope-elimination-and-restoration technique is shown which converts a CDMA input signal consisting of sequences of 16-bit CDMA in-phase (I) and quadrature-phase (Q) digital words to a power-amplified output phase- and amplitude-modulated RF signal that is supplied to an antenna 101 for downlink transmission to the mobile terminals (not shown) within the base station's coverage area. Although the digital input I and Q words are shown for purposes of illustration as being derived from a CDMA signal source 102 within the transmitter, in actuality they generally will be provided to the transmitter from circuitry outside the transmitter.

A signal converter 103 transforms each pair of 16-bit I and Q words to corresponding 16-bit AMP and φ words representing phase and amplitude information, respectively. Specifically, converter 103 calculates each AMP word as being equal to SQRT($I^2+Q^2$), and each corresponding φ word as being equal to ARCTAN(Q/I). The sequence of phase words, φ, is converted to a baseband signal by digital-to-analog (D/A) converter 104. A phase modulator 105 then modulates an RF carrier supplied by RF carrier source 106 with this baseband phase signal. A series of low-level amplifiers 107 and 108, for example, amplifies the phase-modulated RF signal to produce a baseband phase-modulated RF signal that is inputted to RF power amplifier 109. Since all the relevant information is contained in the phase of the RF-modulated phase signal, amplifiers 107 and 108 do not have to be linear amplifiers and can be any type of efficient amplifier such as, for example, class C or class E amplifiers. RF power amplifier 109 produces a high-power output RF signal suitable for transmission by antenna 101.

While the phase portion of the CDMA input signal is converted to a baseband signal that is used to modulate the phase of the RF carrier, the digital CDMA amplitude information, the sequence of AMP words containing the amplitude portion of the CDMA signal, is converted to a baseband signal that is used to modulate the amplitude of the output of RF power amplifier 109. The sequence of AMP words is therefore converted to a baseband signal and amplified to a high level for input to the RF power amplifier 109. A class D or class S switching amplifier is a high-efficiency amplifier capable of linearly amplifying the baseband amplitude signal. As previously noted, however, prior art switching amplifiers are limited with respect to their bandwidth and dynamic range. A conventional prior art switching amplifier does not have the dynamic range necessary for handling a 1.25 MHz 16-bit input signal, which mathematically has over 65,000 possible input levels. In order to reduce the dynamic range requirements imposed upon the switching amplifier, the granularity of the signal provided to the switching amplifier for amplification is reduced. Specifically, before being converted to a baseband signal, a predetermined number of the least significant bits of each AMP word are truncated, thereby reducing the resolution of the signal inputted to the switching amplifier thereby reducing the dynamic range needed by that amplifier. The desired high-granularity is then reintroduced to the amplified low-resolution output of the switching amplifier by means of a post regulator circuit that dissipates power in that low-resolution output signal. The output of the post-regulator having the desired high resolution is then used to modulate the amplitude of the output of the RF power amplifier 109.

With reference again to FIG. 1, the sequence of AMP output words outputted by of circuit 103 are inputted to a scale, bias and truncate circuit 110. Circuit 110 functions in the digital domain to multiply the value of each 16-bit AMP word produced by signal converter 103 by a scale factor of less than one, thereby reducing the range of its possible values in order to provide sufficient headroom to bias up each such value and still maintain the value of each possible word to less than the maximum word value that the system can handle. Thus, when the post regulator at the output of the switching amplifier dissipates power in the switching amplifier output signal, thereby lowering its output level and adding the desired granularity back into that amplified output by means of a high-gain feedback loop, the post regulator output will be driven to its desired output. After scaling and biasing, circuit 110 truncates a predetermined number of the least significant bits, for example, the least significant 10 bits, of each AMP word. The resultant truncated digital signal has a granularity of only 64 different possible levels rather than the over 65,000 possible levels of the 16-bit input AMP word. The sequence of scaled, biased and truncated AMP words is converted by digital-to-analog (D/A) circuit 111 to a baseband signal, which is inputted to switching amplifier 112. Switching amplifier 112, which can be a conventional class D or class S switching amplifier, linearly amplifies this baseband signal, which is then inputted to a post regulator 113. Post regulator 113 includes a power-dissipating regulating element 114 and an error-generating component 115. The error-generating component 115 generates an error signal from the difference between the high-resolution baseband signal produced by D/A converter 116 from the sequence of 16-bit AMP words outputted by signal converter 103, and the output of the regulating element 114. When the gain of the feedback provided back to the regulating element 114 is high, the error signal, which in inputted to the regulating element 114, is driven to zero, thereby imposing the high-resolution of the 16-bit signal onto the output signal of the regulating element 114 and correcting for the scaling and biasing imposed upon the low-resolution signal inputted to the switching amplifier 112. The resultant high-resolution high-level output of post regulator 113 is then used to amplitude-modulate the high-power output of RF power amplifier 109.

Figure 2:
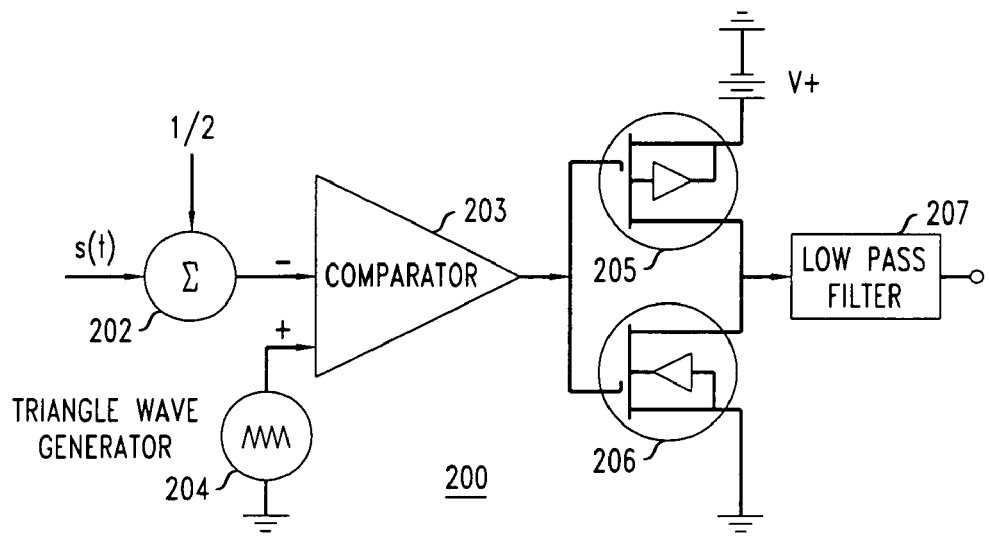
FIG. 2 is a schematic diagram of an example of an embodiment of a switching amplifier that can be used in the CDMA transmitter of FIG. 1.

FIG. 2 is an example of a conventional switching amplifier 200 to which the baseband signal derived from only the higher order bits of the amplitude portion of the CDMA signal is applied. It includes a signal summer 202 to which the input signal S(t) (from the output of D/A converter 111) and a bias of ½ are applied to form an input to a signal comparator 203. The output of a triangle-wave generator 204, having a frequency $f_S$, is inputted to the second input of comparator 203. The frequency $f_S$ is the switching frequency of the switching amplifier and is typically set at 10 times the highest input signal frequency. Triangle-wave generator 204 and comparator 203 combine to form a pulse-width modulator, which converts S(t) into a train of pulses with a period $T=1/f_S$, and a time-varying duty factor D(t). The pulse train at the output of comparator 203 is applied to FETs 205 and 206, which act as switches. When the output of comparator 203 is low, the voltage source V+ is applied to the input of a low pass filter 207. When the output of comparator 203 is high, the input to low pass filter is grounded. The output of low pass filter 207 is the input S(t) plus ½ scaled up by $\eta V+$, where $\eta$ represent the losses in the FETs 205 and 206 and the filter 207.

Figure 3:
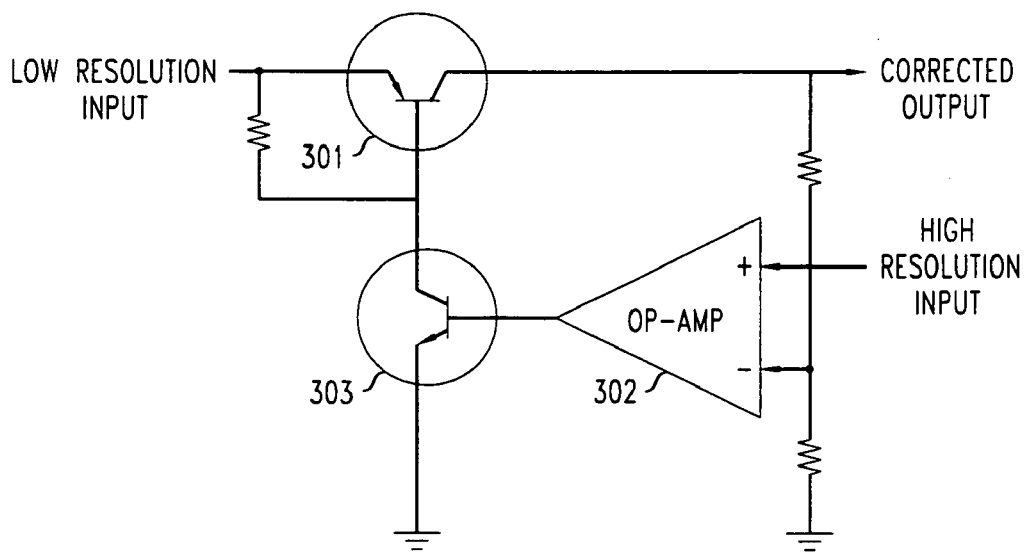
FIG. 3 is a schematic diagram of an example of an embodiment of a post regulator that that can be used in conjunction with the switching amplifier in FIG. 2 in the CDMA transmitter in FIG. 1.

FIG. 3 shows an example of an implementation of a regulator to which the low-resolution amplified output of the switching amplifier and the baseband high-resolution amplitude portion of the input CDMA signal are inputted. The low-resolution amplified output of the switching amplifier is inputted to pnp pass transistor 301. The collector output of transistor 301, is connected to the negative input of a high-gain operational amplifier (OP-AMP) 302 while the baseband high resolution amplitude portion of the CDMA input signal is provided to the positive input of OP-AMP 302. The resultant error signal, equal to the difference between the OP-AMP's two input signals, is provided to the base of npn driver transistor 303, the collector of which is connected to the base of pass transistor 301. With a high feedback gain, the error signal at the output of OP-AMP is driven to zero, thereby imparting to the high resolution of the low-level baseband input signal to OP-AMP 302, to the high-level signal on the collector output of pass transistor 301.

The combination of a switching amplifier to amplify a truncated high-resolution input signal and a power-dissipating post regulator element to reintroduce high-resolution granularity back into the amplified output of the switching amplifier is not limited to use in a CDMA transmitter. Such an arrangement can be used for any single-ended application in which high-resolution and wide-bandwidth amplification are required.

Figure 4:
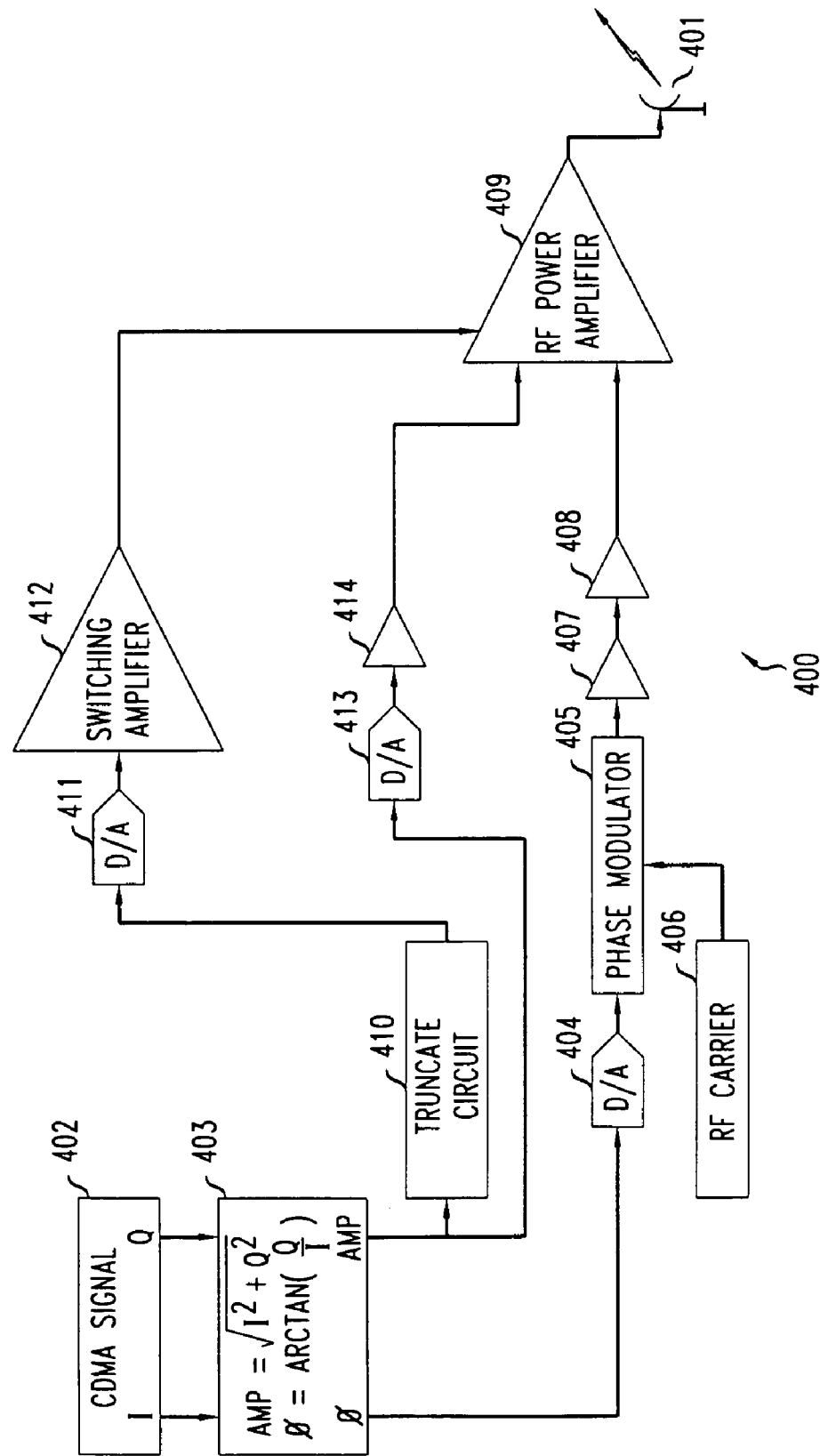
FIG. 4 is a schematic diagram of a second embodiment of a CDMA transmitter in accordance with the present invention.

A second embodiment of a CDMA base station transmitter in accordance with the present invention is shown in FIG. 4. As in FIG. 1, CDMA base station transmitter 400 converts an input signal consisting of sequences of 16-bit CDMA in-phase (I) and quadrature-phase (Q) digital words to a power-amplified output phase- and amplitude-modulated RF signal that is supplied to an antenna 401 for downlink transmission. As in FIG. 1, a signal converter 403 transforms each pair of 16-bit I and Q words supplied from a CDMA signal source 402 to corresponding amplitude and phase words, AMP and $\phi$, respectively. D/A converter 404 converts the sequence of digital phase words $\phi$ into a baseband signal, which is inputted to a phase modulator 405 for modulation by an RF carrier supplied by RF carrier source 406. A series of low-level amplifiers 407 and 408 amplifies the phase-modulated RF signal to produce a high-level phase-modulated RF signal that is inputted to RF power amplifier 409. As in the embodiment in FIG. 1, amplifiers 407 and 408 do not have to be linear amplifiers and can be any type of efficient amplifier such as, for example, class C or class E amplifiers.

While the phase portion of the CDMA input is converted to baseband and is used to modulate the phase of the RF carrier, the sequence of AMP words containing the amplitude portion of the CDMA signal is converted to a baseband signal and is used to modulate the output of RF power amplifier 409. As previously discussed, efficient prior art linear amplifiers do not have the high dynamic range need to amplify the baseband signal to a level needed for input to the RF power amplifier. Truncate circuit 410 thus truncates a predetermined number of the least significant bits of each AMP word such as, for example, the 10 least significant bits. The sequence of resultant truncated AMP words having only 6-bits of resolution and a granularity of only 64 possible levels is converted to a low-level baseband signal by D/A converter 411. This baseband signal containing the amplitude information is then inputted to an efficient switching amplifier 412, such as the switching amplifier in FIG. 2, to produce a linearly amplified high-level low-resolution signal.

While the baseband signal derived from the sequence of truncated 16-bit AMP words outputted by signal converter 403 is amplified by switching amplifier 412, the sequence of these same high-resolution 16-bit AMP words is converted to a baseband signal by D/A converter 413. The resultant high-resolution baseband signal is biased-up by a high-speed operational amplifier 414 to raise all signal values of the baseband signal above zero. The high-level low-resolution baseband signal produced by switching amplifier 412 and the low-level high-resolution signal outputted by amplifier 414 are used together to amplitude modulate the signal being amplified by RF power amplifier 409 so as to impart a net high-resolution amplitude modulation upon the output of the RF power amplifier. Specifically, the high-level low-resolution output of switching amplifier 412 is applied to the high-level modulation input of RF power amplifier 409 while the low-level high-resolution output of amplifier 414 is applied to the control element of that RF power amplifier. Typically, the RF power amplifier 409 will be implemented in an FET circuit. The high-level low-resolution baseband signal outputted by switching amplifier 412 will be applied to the drain of that FET while the low-level high-resolution baseband signal outputted by amplifier 414 is applied to the gate of the FET. If RF power amplifier 409 is implemented in a bi-polar transistor circuit, then the high-level low-resolution baseband signal will be applied to the collector of that transistor while low-level high-resolution baseband signal is applied to the base of that transistor. The RF power amplifier 409 could also implemented in a vacuum tube circuit in which case the high-level low-resolution baseband signal will be applied to the plate of the vacuum tube while the low-level high-resolution baseband signal is applied to the grid of the tube if the vacuum tube is a triode, and to the screen grid of the tube if the vacuum tube is a tetrode or pentode. Regardless of the embodiment of RF power amplifier 409, the combination of low-resolution modulation on the amplifier's high-level modulation input and high-resolution modulation on the control element produces the desired high-power high-resolution amplitude and phase modulated RF signal for input to the antenna 401.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A transmitter that produces a power-amplified phase- and amplitude-modulated output in response to an input signal, the transmitter comprising:
   a switching amplifier that linearly amplifies an applied amplitude portion of the input signal; and
   a power amplifier that amplitude modulates an amplified phase portion of the input signal in accordance with a least one applied modulating signal derived at least in part from the linearly amplified applied amplitude portion of the input signal produced by the switching amplifier;
   wherein the transmitter further comprises:
   means for reducing the resolution of the amplitude portion of the input signal applied to the switching amplifier, the output of the switching amplifier having the reduced resolution of the applied amplitude portion; and
   means responsive to the reduced-resolution output of the switching amplifier and to the full-resolution amplitude portion of the input signal for restoring the full resolution of the amplitude portion of the input signal back into the modulating signal applied to the power amplifier.

2. The transmitter of claim 1 wherein the input signal is a digital signal comprising a predetermined number of bits per word, and the means for reducing the resolution comprises means for truncating a predetermined number of least significant bits in each word of the input signal.

3. The transmitter of claim 1 wherein the responsive means comprises a post regulator to which the output of the switching amplifier and a signal derived from the full-resolution amplitude portion of the input signal are applied, the post regulator dissipating power in the output of the switching amplifier to drive its resolution to the full-resolution of the amplitude portion of the input signal.

4. The transmitter of claim 1 where the responsive means comprises means for applying the reduced-resolution output of the switching amplifier to a high-level modulation input of the power amplifier, and for applying a signal derived from the full-resolution input signal to a control element of the power amplifier.

5. The transmitter of claim 4 wherein the power amplifier comprises a circuit containing an FET and the output of the switching amplifier is applied to a drain of the FET and the signal derived from the full-resolution input signal is applied to a gate of the FET.

6. The transmitter of claim 4 wherein the power amplifier comprises a circuit containing a bi-polar transistor and the output of the switching amplifier is applied to a collector of the transistor and the signal derived from the full-resolution input signal is applied to a base of the transistor.

7. The transmitter of claim 4 wherein the power amplifier comprises a circuit containing a vacuum tube and the output of the switching amplifier is applied to a plate of the vacuum tube and the full-resolution input signal is applied to a grid of the vacuum tube.

8. The transmitter of claim 2 wherein transmitter is in a base station of a wireless communication system and the input signal is a CDMA signal.

9. The transmitter of claim 1 wherein the switching amplifier is a class D amplifier.

10. The transmitter of claim 1 wherein the switching amplifier is a class S amplifier.

11. An amplifier circuit for linearly amplifying a high-resolution input signal, the amplifier circuit comprising:
    means for reducing the full resolution of the input signal;
    a switching amplifier for linearly amplifying the reduced-resolution input signal; and
    means responsive to a reduced-resolution output of the switching amplifier and to the full resolution input signal for restoring the full resolution of the input signal back into the amplified output signal of the switching amplifier
    wherein the means for restoring the full resolution comprises a post regulator to which the output of the switching amplifier and a signal derived from the full-resolution input signal are applied, the post regulator dissipating power in the output of the switching amplifier to drive its resolution to the full-resolution of the input signal.

12. The amplifier circuit of claim 11 wherein the input signal is a digital signal comprising a predetermined number of bits, and the means for reducing the resolution comprises means for truncating a predetermined number of least significant bits in each word of the input signal.

13. The amplifier circuit of claim 11 wherein the switching amplifier is a class D amplifier.

14. The amplifier circuit of claim 11 wherein the switching amplifier is a class S amplifier.

* * * * *